United States Patent [19]

Hale et al.

[11] Patent Number: 5,494,120
[45] Date of Patent: Feb. 27, 1996

[54] GLYCOSIDE-IN-OIL DRILLING FLUID SYSTEM

[75] Inventors: Arthur H. Hale; Royal E. Loftin, both of Houston, Tex.

[73] Assignee: Shell Oil Company, Houston, Tex.

[21] Appl. No.: 287,565

[22] Filed: Aug. 9, 1994

[51] Int. Cl.⁶ ........................................ C09K 7/00
[52] U.S. Cl. ........................................ 175/72
[58] Field of Search ............... 175/72; 525/54.3, 525/54.31, 255

[56] References Cited

U.S. PATENT DOCUMENTS 4,422,948  12/1983  Corley et al. ............. 175/72 X
5,045,593   9/1991  Cowan et al. ............. 525/54.3

*Primary Examiner*—William P. Neuder

[57] ABSTRACT

An invert oil emulsion drilling fluid containing oil, an emulsifier such as a fatty acid soap, clay or polymer, and a glycoside such as glucoside.

3 Claims, No Drawings ns: 5,494,120

GLYCOSIDE-IN-OIL DRILLING FLUID SYSTEM

BACKGROUND OF THE INVENTION

This invention relates to oil base drilling fluids. More particularly, the invention relates to invert glycoside-in-oil drilling fluids having good rheological and fluid loss properties, while alleviating many of the problems associated with maintenance of the ionic strength of the internal water phase. They have good temperature stability and the emulsion is stable under a variety of conditions (weight, temperature, presence of drill solids, formation water, etc.).

Oil-in-water emulsion drilling fluids (or muds) generally comprise water, oil, emulsifier, clays or polymers, and various treating agents which control the physical, chemical and/or rheological properties of drilling fluids in wellbores. Oil-in-water emulsion-type drilling fluids have been used advantageously in the oil well drilling industry for many years. Emulsion drilling fluids possess many advantages over regular muds such as increasing drilling rates, longer bit lives, improved hole conditions, and the like. The most commonly used emulsion drilling fluids are oil-in-water types wherein oil is the dispersed phase and water the continuous phase. Inverted or water-in-oil emulsions wherein oil is the continuous phase and water is the dispersed phase also have been used to advantage.

The selection of a drilling fluid is primarily dependent upon the geological formation being drilled and the problems associated with such formation. Principal concerns in selection of a drilling fluid are temperature of drilling conditions, formation of gas hydrates, shale dispersion, wellbore stability, and drilling fluid loss and environmental requirements. The present invention provides a drilling fluid additive which overcomes these and other problems in the art as more particularly disclosed hereinafter.

SUMMARY OF THE INVENTION

The primary purpose of the present invention is to provide an invert oil emulsion drilling fluid, and process for the use thereof, which drilling fluid contains no water, or substantially no water, or less water than conventional oil-based mud systems. The drilling fluid comprises oil, emulsifier and glycoside as the internal phase of the emulsion. The drilling fluid alleviates much of the borehole stability problem associated with interaction of the typical invert oil-mud internal phase (water) with the clay matrix of the shales drilled. It will reduce shale dispersion and thus also improve wellbore stability. The system is stable at high temperatures with good rheological and fluid loss properties. The drilling fluid of this invention also allows low temperature and high pressure drilling operations, It is a good system for inhibition of gas hydrates which form at low temperatures and high pressure.

In addition, the present invention is directed to a method for drilling a well comprising rotating a drill string to cut a borehole into the earth; and circulating invert oil emulsion drilling fluid comprising oil, emulsifier and glycoside as the internal phase of the emulsion through the drill string and through the annulus between the drill string and the wall of the borehole. Preferably, the drilling fluid contains no water, or substantially no water, or less water than conventional oil-based mud systems. The method also preferably includes monitoring the influx of formation water into the drilling fluid.

Other purposes, distinctions over the art, advantages and features of the invention will be apparent to one skilled in the art upon review of the following.

DESCRIPTION OF PREFERRED EMBODIMENTS

Applicant has discovered that the use of glycoside as the internal phase of an invert oil emulsion drilling fluid presents certain advantages. Removal of most of the water from an oil-based mud alleviates many of the borehole stability problems associated with the interaction of the water phase with the clay matrix of the shales drilled. The calcium chloride brine in typical oil mud formulations is added for the purpose of obtaining what is referred to in the drilling fluid industry as "balanced activity"—that is the water activity of the oil-based muds is the same as that of the shale. The removal of brine from the formulation reduces this problem since glycoside-like molecules do not interact with the clay matrix in such a way as to cause swelling pressures of the magnitude observed with water. In addition, the activity range is such that glycoside can be used instead of brines. This gives the drilling engineer greater flexibility in how the mud is formulated for a given type of shale. The ability to not use brine reduces the environmental impact since the chlorides of the calcium chloride brine are environmentally limiting. Rheological and fluid loss properties of the glycoside-based mud are essentially the same as those observed with more typical oil-based muds. Additives which are currently available in the industry are applicable in the new mud system of this invention.

Although a primary advantage of this invention is to have an oil-based mud with no brine, nothing precludes the addition of some water or the addition of a brine. If it is appropriate to increase the salt concentration, or to raise the water activity by simple dilution with water, this may be done easily without significant alternations to the mud properties.

The ability to monitor the influx of formation water taken while drilling and to determine the composition and concentrations at the rig is a unique advantage that is essentially impossible with current technology. Even with sophisticated equipment in an analytical laboratory, the presence of a salt, e.g., NaCl or $CaCl_2$, in the initial internal phase would provide a background that would make it difficult to identify those cations and anions specific to the water influx.

In most instances, the applicable amount of glycoside in the invert oil emulsion drilling fluid, optionally including water or brine, will be determined on a well-to-well basis. A concentration of glycoside in the emulsion of at least about 30, preferably at least about 50, more preferably at least about 90, or most preferably about 100 percent by weight and, optionally, of brine or water of up to about 70, preferably up to about 50, more preferably up to about 10, and most preferably about 0 percent by weight, based on the total weight of the internal phase of the drilling fluid, is suitable to achieve the objectives of the invention.

The various inorganic salts suitable for use with the invention include, but are not limited to, NaCl, NaBr, KCl $CaCl_2$ and $NaNO_3$, among which $CaCl_2$ is preferred.

Oils suitable for the invention include mineral oil, crude oil, diesel fuel oil, kerosene, gas oil, polyalphaolefin, olefin, paraffins, white oil, linear alkylbenzene, acetal, ether (di isodecyl ether), ester based vegetable oils, mixtures thereof, and the like.

The use of salts of various kinds is done primarily for the purpose of wellbore stability. A basic requirement for optimal conditions to drill shale is that the water phase in the oil-mud must be in osmotic balance with the shale. Thus, for a hard dry shale, typically high salt concentrations are required to prevent the swelling pressures in the wellbore from increasing due to hydration.

The advantage of using glycosides in the internal phase is that much of the concern for the ionic character of the internal phase is no longer required. If water is limited in the system, the hydration of the shales is greatly reduced. That is not to say that the glycosides do not interact with the clays of the shale However, the reduced water activity of the internal phase of the mud and the improved efficiency of the shale as an osmotic barrier (if the glycoside interacts directly with the shale) will help to lower the water content of the shale thus increase rock strength and lower effective mean stress and therefore stabilize the wellbore.

The emulsifiers used in this invention are the same ones typically used in water-in-oil drilling fluids. These include the various fatty acid soaps, preferably the calcium soaps, polyamides, and mixtures. These soaps are formed while mixing the water and oil phase together in conjunction with lime which is the primary source of calcium. Such emulsifiers are listed in the following patents: U.S. Pat. Nos. 281,042; 2,876,197; 2,994,660; 299,063; 2,962,881; 2,816,073; 2,793,996; 2,588,808; and 3,244,638.

A variety of weighting agents can be used in the present invention as well as in the typical water-in-oil emulsions. These are barite, galena, ilmenite, iron oxides, siderite, calcite, and the like.

Any of the typically used suspending agents known to the industry can be used. The preferred suspending agent is an organophilic clay (organoclay). The descriptions of these agents can be found in the following references: U.S. Pat Nos. 2,531,427; 2,966,506; 4,105,578; and 4,208,218.

EXAMPLES

In Formulations 1 and 2 (hot rolled 16 hours at 150° F.) a simple formulation at 14.0 ppg is shown. The data demonstrates the ease of formulating with methyl glucoside a functional mud. However, as shown in Formulation 4, the addition of a salt water (simulate a water flow) causes a significant increase in fluid loss and water break-out. In Formulations 5 and 6, the addition of well established drilling fluid additives solved the fluid loss problem when salt solution was a contaminant. The rheological properties were good and the system was stable. In Formulation 3 solids were added to demonstrate that the system was able to incorporate drill solids. The fluid loss was still good with the rheological parameters increased (plastic viscosity, gel strengths) but acceptable.

Formulations 7, 8 and 9 were done to demonstrate that good rheological parameters and fluid loss control could be maintained at different densities. Formulations could also be designed using different oil methyl glucoside ratios. The ability to formulate systems at different densities and oil methyl glucoside ratios is important in applying this technology.

Generally the data show good rheology even though various problem additives are included.

| | GLUCOSIDE METHYL INVERT | | | | | | | | | |
|---|---|---|---|---|---|---|---|---|---|---|
| | Sample Identification | | | | | | | | | |
| | 1 | 2 | 3 | 4 | 5 | 6 | 7 | 8 | 9 | 10 |
| Formulation: | | | | | | | | | | |
| Mineral Oil (ml) | 225 | 225 | 225 | 225 | 225 | 225 | 281 | 245 | 181 | 188 |
| Methyl Glucoside (ml) | 40 | 40 | 40 | 40 | 40 | 40 | 50 | 43 | 32 | 80 |
| Emulsifier (gm) | 6 | 6 | 6 | 6 | 6 | 6 | 6 | 6 | 6 | 6 |
| Wetting Agent (gm) | 8 | 8 | 8 | 8 | 8 | 8 | 8 | 8 | 8 | 8 |
| Organophilic Clay (gm) | 8 | 8 | 8 | 8 | 8 | 8 | 8 | 8 | 2 | 4 |
| Lime (gm) | 10 | 10 | 10 | 10 | 10 | 10 | 10 | 10 | 10 | 10 |
| Barite (gm) | 358 | 358 | 358 | 358 | 358 | 358 | 82 | 260 | 576 | 345 |
| Additives: | | | | | | | | | | |
| Drill Solids (gm) | 0 | 0 | 30 | 0 | 0 | 0 | 0 | 0 | 0 | 0 |
| 10% NaCl Solution (ml) | 0 | 0 | 0 | 35 | 35 | 35 | 0 | 0 | 0 | 0 |
| Amine-Treated Lignite (gm) | 0 | 0 | 0 | 0 | 8 | 0 | 0 | 0 | 0 | 0 |
| Test Results: | | | | | | | | | | |
| Gilsonite (gm) | 0 | 0 | 0 | 0 | 0 | 6 | 0 | 0 | 0 | 0 |
| Conditions | Init. | hr150[1] | hr150 | hr150 | hr150 | hr150 | hr150 | hr150 | hr150 | hr150 |
| Mud Weight (ppg) | 14 | 14 | 14 | 14 | 14 | 14 | 10 | 12 | 18 | 14 |
| Oil/Methyl Glucoside Ratio | 85/15 | 85/15 | 85/15 | 85/15 | 85/15 | 85/15 | 85/15 | 85/15 | 85/15 | 70/30 |
| 600 rpm | 52 | 51 | 96 | 66 | 77 | 64 | 21 | 38 | 75 | 64 |
| 300 rpm | 31 | 28 | 52 | 38 | 43 | 37 | 12 | 21 | 37 | 33 |
| 200 rpm | 24 | 21 | 43 | 29 | 32 | 28 | 9 | 15 | 25 | 23 |
| 100 rpm | 16 | 13 | 28 | 19 | 20 | 19 | 6 | 10 | 14 | 14 |
| 6 rpm | 6 | 5 | 8 | 7 | 6 | 8 | 2 | 4 | 3 | 3 |
| 3 rpm | 5 | 4 | 7 | 6 | 5 | 7 | 2 | 3 | 2 | 2 |
| Plastic Viscosity[2] (cps) | 21 | 23 | 44 | 28 | 34 | 27 | 9 | 17 | 38 | 31 |
| Yield Point (#/100 ft$^2$) | 10 | 5 | 8 | 10 | 9 | 10 | 3 | 4 | −1 | 2 |
| Gels Strength[3] | 7/9 | 6/8 | 10/16 | 8/10 | 8/11 | 9/11 | 3/5 | 6/6 | 3/4 | 4/6 |

-continued

| | GLUCOSIDE METHYL INVERT | | | | | | | | | |
|---|---|---|---|---|---|---|---|---|---|---|
| | Sample Identification | | | | | | | | | |
| | 1 | 2 | 3 | 4 | 5 | 6 | 7 | 8 | 9 | 10 |
| (#/100 ft$^2$) HTHP$^4$ Fl. (200° F.) (ml) | | 5.6 | 9.5 | 18.6 oil 3.4 water | 2 | 3 | 9.6 | 11.4 | 5.2 | 4.4 |
| Electrical Stability$^5$ (volts) | 365 | 544 | 1077 | 284 | 428 | 465 | 323 | 421 | 572 | 390 |

[1] Hr150 means the sample has been hot rolled 16 hours at 150° F.
[2] The lower the number for plastic viscosity, the better it is.
[3] Gel strengths at 10 seconds/10 minutes.
[4] HTHP means high temperature, high pressure.
[5] Electrical stability is a measure in volts required to break an emulsion. The higher the number, the more resistant the emulsion to breaking.
NOTE: HTHP Fl., Sample No. 4 was contaminated with salt water to show an influx is harmful. Then Sample Nos. 5 and 6 were chemically treated to correct the problem and reduce the fluid loss.

What is claimed is:

1. A method for drilling a well comprising:
   rotating a drill string to cut a borehole into the earth; and
   circulating invert oil emulsion drilling fluid, said drilling fluid comprising oil, emulsifier and glycoside, through the drill string and through the annulus between the drill string and the borehole, the glycoside being at least about 30% by weight of the internal phase of the emulsion.

2. The method of claim 1 wherein the glycoside is at least about 50% by weight of the internal phase of the emulsion.

3. The method of claim 1 wherein the glycoside is at least substantially water-free.

* * * * *